(12) United States Patent
Riss et al.

(10) Patent No.: US 8,127,245 B2
(45) Date of Patent: Feb. 28, 2012

(54) MULTI-DIMENSIONAL SYSTEMS AND CONTROLS

(75) Inventors: Uwe V Riss, Heidelberg (DE); Sylvia B. Scheu, Sandhausen (DE)

(73) Assignee: SAP AG, Walldorf (DE)

( * ) Notice: Subject to any disclaimer, the term of this patent is extended or adjusted under 35 U.S.C. 154(b) by 287 days.

(21) Appl. No.: 11/095,898

(22) Filed: Mar. 30, 2005

(65) Prior Publication Data

US 2006/0224998 A1 Oct. 5, 2006

(51) Int. Cl.
*G06F 3/048* (2006.01)

(52) U.S. Cl. ......... 715/782; 715/786; 715/787; 715/839

(58) Field of Classification Search .................. 715/782, 715/786, 787, 839, 848–852
See application file for complete search history.

(56) References Cited

U.S. PATENT DOCUMENTS

| | | | | |
|---|---|---|---|---|
| 5,339,391 A * | 8/1994 | Wroblewski et al. | ......... | 345/607 |
| 5,479,600 A * | 12/1995 | Wroblewski et al. | ......... | 715/787 |
| 5,506,951 A * | 4/1996 | Ishikawa | ................ | 715/786 |
| 5,528,735 A * | 6/1996 | Strasnick et al. | ............. | 345/427 |
| 5,555,354 A * | 9/1996 | Strasnick et al. | ............. | 345/427 |
| 5,671,381 A * | 9/1997 | Strasnick et al. | ............. | 715/848 |
| 5,767,854 A * | 6/1998 | Anwar | ............................ | 715/848 |
| 5,847,706 A * | 12/1998 | Kingsley | ....................... | 715/788 |
| 5,867,678 A * | 2/1999 | Amro et al. | ................. | 715/786 |
| 5,874,961 A * | 2/1999 | Bates et al. | .................. | 715/786 |
| 5,903,267 A * | 5/1999 | Fisher | ........................... | 715/786 |
| 5,973,663 A * | 10/1999 | Bates et al. | .................. | 715/786 |
| 6,195,089 B1 * | 2/2001 | Chaney et al. | ................ | 725/56 |
| 6,229,542 B1 * | 5/2001 | Miller | ........................... | 715/782 |
| 6,259,451 B1 * | 7/2001 | Tesler | ........................... | 345/419 |
| 6,359,635 B1 * | 3/2002 | Perttunen | ..................... | 715/834 |
| 6,404,444 B1 * | 6/2002 | Johnston et al. | ............. | 715/839 |
| 6,473,104 B1 * | 10/2002 | Harris | ........................... | 715/833 |
| 6,590,594 B2 * | 7/2003 | Bates et al. | .................. | 715/784 |
| 6,664,986 B1 * | 12/2003 | Kopelman et al. | ............ | 715/849 |
| 6,750,864 B1 * | 6/2004 | Anwar | .......................... | 345/440 |
| 6,819,344 B2 * | 11/2004 | Robbins | ....................... | 715/848 |
| 6,842,176 B2 * | 1/2005 | Sang'udi et al. | ............. | 345/440 |
| 7,043,702 B2 * | 5/2006 | Chi et al. | ...................... | 715/853 |
| 7,089,506 B2 * | 8/2006 | Gantenhammer et al. | .... | 715/850 |
| 2002/0186252 A1 * | 12/2002 | Himmel et al. | ............... | 345/787 |
| 2003/0142136 A1 * | 7/2003 | Carter et al. | ................. | 345/782 |
| 2005/0091604 A1 * | 4/2005 | Davis | ............................ | 715/772 |
| 2006/0174211 A1 * | 8/2006 | Hoellerer et al. | ............ | 715/782 |

* cited by examiner

*Primary Examiner* — Michael Roswell

(74) *Attorney, Agent, or Firm* — Mintz Levin Cohn Ferris Glovsky and Popeo, P.C.

(57) ABSTRACT

An information access system and method are disclosed. A system includes a user input device and a graphical user interface responsive to commands from the user input device. A plurality of graphical structures is displayed in the graphical user interface. Each graphical structure is defined by three or more spatial dimensions, the intersection of which defines a segment. Each segment represents a defined group of information associated with the intersection of dimensions. Each group can be created manually, or defined algorithmically. The system further includes one or more controls displayed in the graphical user interface, responsive to the commands generated from the user input device, and configured for graphically manipulating selected segments of the one or more graphical structures.

20 Claims, 3 Drawing Sheets

MULTI-DIMENSIONAL SYSTEMS AND CONTROLS

BACKGROUND

The following description relates to a graphical user interface (GUI) for accessing information. The information can include documents or other data objects such as a file, an image, a graphic, or portion thereof, or any other collection or format of information that can be electronically stored in a storage medium. Stored information can be accessed and retrieved from storage by a user through an interface. A computing system commonly employs a GUI for information access. In the GUI, representations of discrete parts of information are presented to a user in at least one type of arrangement that defines a relationship among a group of data objects. Typically, such information is represented as a graphic or text.

Graphical representations of information arrangements in a GUI are typically standardized in a computing system. For instance, application programs that are compatible with the Microsoft Windows™ operating system display a group of information as a collection of large icons or small icons, or as a list, and may include details or a thumbnail representation. Folders, documents, pictures, files, etc., can each have their own unique identifying icon. Further, icons can be arranged and displayed according to name, type, size, or date, etc. Alternatively, Web-based applications that are accessible from a web page or portal can display a variety representations of information as a hyperlink defined according to a markup language. Common representations include underlined blue text, an icon or other graphic.

Regardless how the information arrangements are displayed, a user is usually presented with only one arrangement at a time. If two or more arrangements are presented, the user can usually only navigate one arrangement at a time. As one data object may be associated with more than one arrangement, and as several storage arrangements can overlap, conventional access and retrieval systems are limited in their capability to display multiple arrangements of data objects for quick access. However, if more than two arrangements are presented in a GUI, the navigation of information represented thereby is difficult, and searching a graphical depiction thereof tends to be very difficult.

SUMMARY

A method and system are disclosed, whereby access to stored information is improved.

In an embodiment, an information system includes a graphical user interface displaying one or more graphical structures. Each graphical structure is defined by two more spatial dimensions, the intersection of which defines a segment, wherein each segment represents a defined collection of information associated with the intersection of dimensions. The system further includes one or more controls displayed in the graphical user interface, the controls responsive to user input, and configured for graphically manipulating selected segments of the one or more graphical structures.

In another embodiment, an information access system includes a user input device and a graphical user interface. The system further includes a plurality of graphical structures displayed in the graphical user interface, each graphical structure defined by three or more spatial dimensions, the intersection of which defines a segment, and each segment represents a defined collection of information associated with the intersection of dimensions. The system further includes one or more controls displayed in the graphical user interface, responsive to the commands generated from the user input device, and configured for graphically manipulating selected segments of the one or more graphical structures.

In yet another embodiment, a method for accessing information includes displaying one or more graphical structures in a graphical user interface, each graphical structure being defined by two more spatial dimensions, the intersection of which defines a segment, and wherein each segment represents a defined collection of information associated with the intersection of dimensions. The method further includes displaying one or more controls in the graphical user interface, the controls being responsive to user input, and being configured for graphically manipulating selected segments of the one or more graphical structures.

Details of one or more implementations are set forth in the accompanying drawings and the description below. Other features and advantages may be apparent from their description and drawings, and from the claims.

BRIEF DESCRIPTION OF THE DRAWINGS

These and other aspects will now be described in detail with reference to the following drawings.

DETAILED DESCRIPTION

The systems and techniques described here relate to providing access to data objects stored according to one or more storage arrangements.

Figure 1:
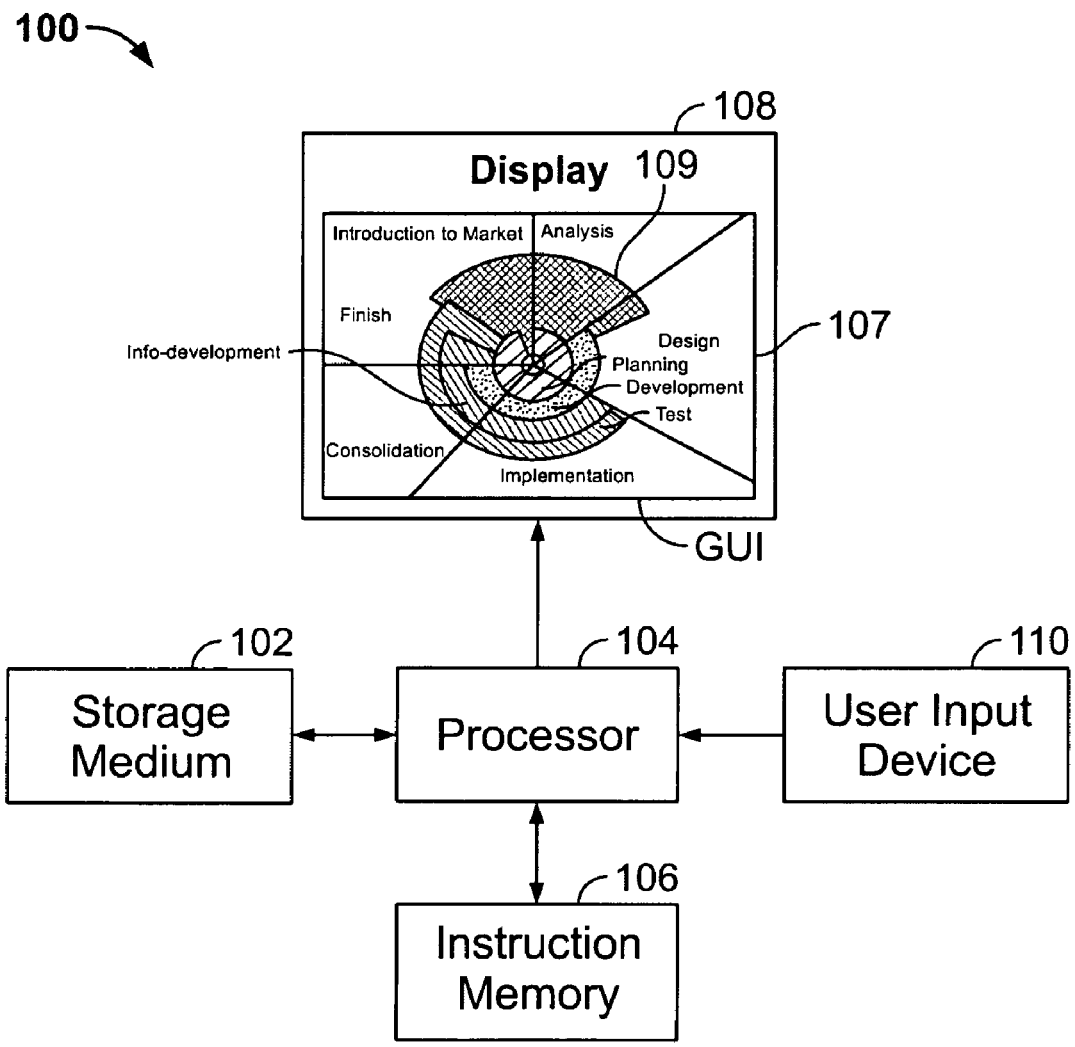
FIG. 1 is a block diagram of a computing system for providing access to stored data objects.

FIG. 1 is a block diagram of a system 100 for providing access to stored data objects. The system 100 includes a storage medium 102 for storing one or more data objects in electronic form for access by a computer processor 104. The storage medium 102 can include a range of device types, such as disk drives, removable media drives, redundant array of independent disks, optical storage, holographic storage, etc, and can also include a range of storage technologies, such as a relational database, an object-oriented database, or distributed database. The storage medium 102 is depicted in FIG. 1 as a single component, but may be distributed across multiple computing platforms. The storage medium 102 is also depicted in FIG. 1 as an integrated component of the computing system 100, but may also be remotely located from and accessible by the processor 104 by any of a number of forms of communication.

The processor 104 is configured to operate under instruction from an instruction memory 106. The instruction memory 106 can be any type of primary storage medium such as random access memory (RAM), read-only memory (ROM), or disk drive memory, etc. The instruction memory 106 includes computer software or instruction code that causes the processor 104 to operate in accordance with certain instructions. The computer software can include operating system code, application code, or other machine-readable instruction code.

The processor 104 may include a graphics processor for generating two- or three-dimensional graphical surfaces or objects from input data from the instruction memory 106 and/or storage medium 102. The processor 104 receives user commands/requests via user input device 110. The user input device 110 may be a mouse or other input device which sends a signal representing a user command/request to the processor 104, such as a microphone, a keyboard, a keypad, trackball, light pen, laser pointer, or the like.

The processor 104 generates a graphical user interface (GUI) 107 in a display 108. The GUI 107 can be provided as a portal to a network, a window in a browser program, or provided as an interface for any other application. The display 108 can be a cathode ray tube (CRT), liquid crystal display (LCD), light-emitting diode, gas plasma, or other image projection technology. The display 108 is also known as a monitor or video display terminal (VDT) on which the GUI 107 is displayed. The display 108 can include a device that produces the GUI 107, or may be integrated with the processor 104. For instance, signal-handling devices such as a video adapter, video RAM, and digital-to-analog converters for generating the GUI 107 may be part of the processor 104, the display 108, or distributed among both.

The storage medium 102 is configured to store one or more data objects. The data objects are stored according to a logical or physical arrangement. Each arrangement may represent a hierarchy or organizational structure, such as by date (i.e. creation, modification, storage, etc.), by relationship (i.e. product catalog, product life cycle, customer information, etc.) or by any other arrangement. Each arrangement can also be displayed in the GUI 107 as a graphical surface or object.

The GUI 107 is navigable by a user operating the user input device 110. In accordance with a process for accessing data objects stored in the storage medium 102, the processor 104, under instruction of the instruction memory 106, generates a graphical representation of the stored data objects on the display 108 so that a user can access one or more of the stored data objects. The processor 104 is configured to represent a processed combined representation of two or more arrangements of data objects as a graphical structure that, when rendered in the GUI 107 in the display 108 define a number of user-selectable graphical segments 109 or graphical controls thereof. Each graphical segment provides a link to one or more data objects represented thereby and stored in the storage medium 102 and that correspond to a portion of the combined arrangements. The graphical objects 109 can be graphically manipulated by the one or more graphical controls in the GUI 107.

Figure 2:
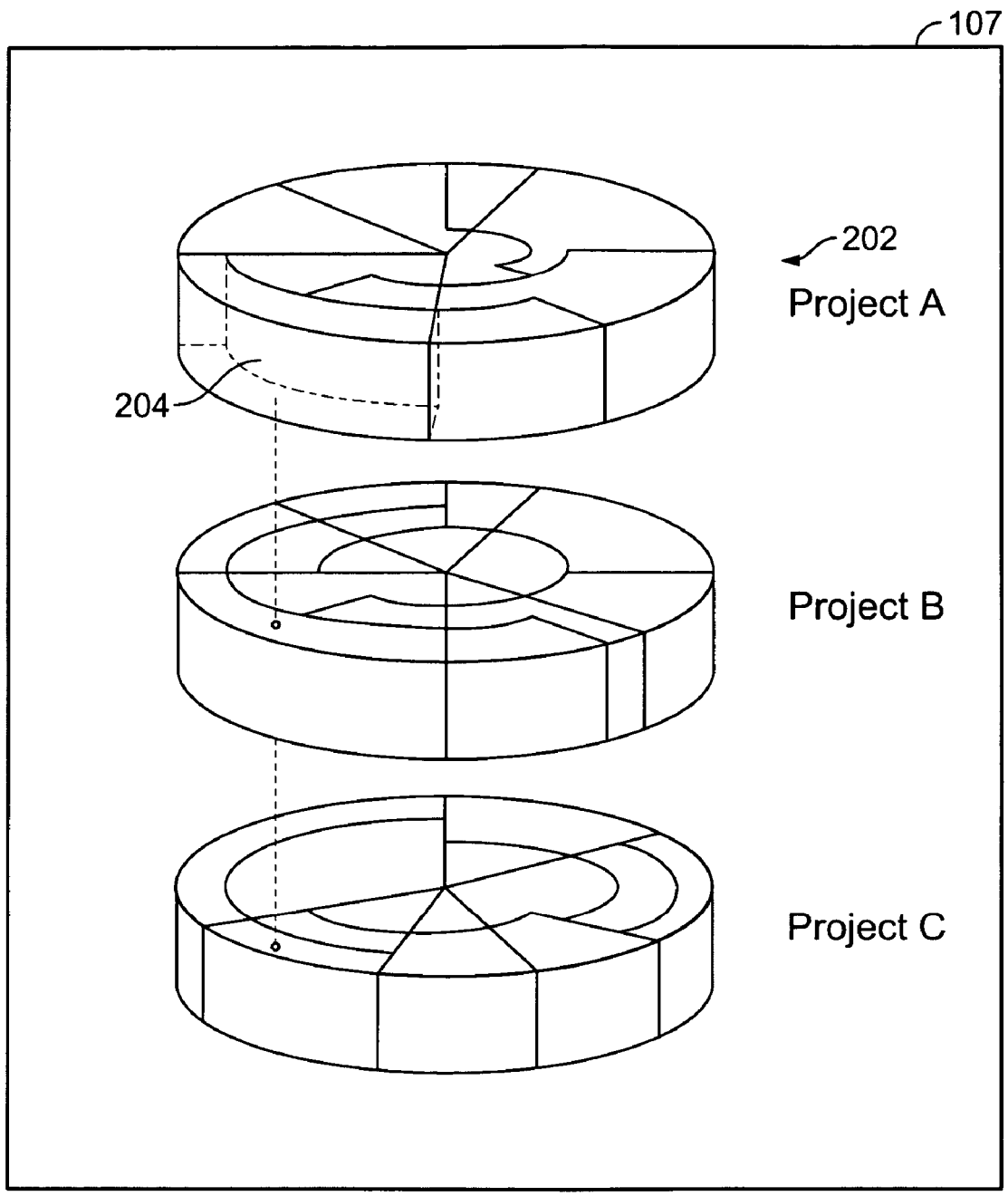
FIG. 2 is a diagram illustrating a three-dimensional version of a graphical access system.

FIG. 2 shows a GUI 107 for accessing data objects in accordance with one exemplary embodiment. The GUI 107 includes a number of three-dimensional graphical structures 202, each being a graphical representation of a multi-dimensional coordinate system such as a cylinder, table, cube, etc., and used for navigation through the dimensions or for the manipulation of the graphical structure 202 itself. Each dimension represents a hierarchy, set of hierarchies, properties or other associations.

Each segment 204 of the graphical structure 202 is defined by the intersection of hierarchical representations or nodes, internally characterized as a tuple in the system. The segments 204 enable access to information about data objects related to the corresponding nodes. Thus, each segment 204 can represent groups of data objects such as documents or any kind of categorized information, such as groups of persons, data or numbers from a report, etc. The source of this information can be static, e.g. in the case of documents, but can also be dynamic, e.g., if the categorized information is the result of a report generating application or other algorithm.

In the exemplary embodiment depicted, each graphical structure 202 is a three-dimensional cylinder and is related to a project. The intersection of first, second and third hierarchical nodes defines a number of segments 204, depicted in the example as a three-dimensional polygon. Each segment 204 can be related to a task of a project, for example, and represent all information associated with that task. Other dimensions can be depicted as patterns, colors, etc., within individual segments 204 or across multiple segments 204.

Many different hierarchical or logical arrangements can be displayed as a graphical structure 202 in the GUI 107. In order to simplify the graphical representation, every segment that refers to an empty intersection, i.e. no data object in a corresponding section of the combined first, second, and third attributes, may removed so that only those segments are displayed that actually contain documents are displayed. The resulting gaps in the GUI 107 may be filled by resizing neighboring segments. Additional graphical representations are possible if one of the dimensions (arrangements) is temporal. For instance, the size or proportions of the segments 204 can be weighted according to a weight scheme.

Figure 3A:
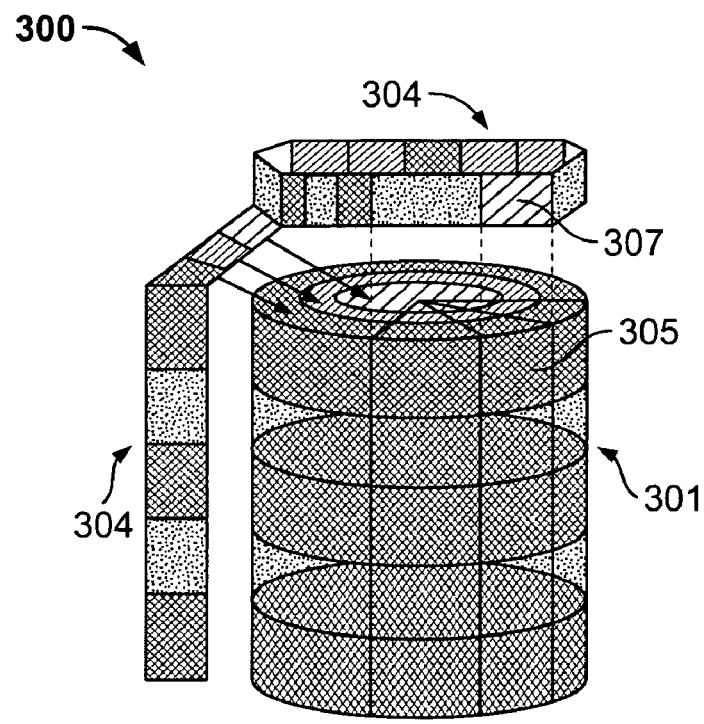
FIGS. 3A and 3B illustrate variants of a multi-dimensional coordinate information access system and controls thereof.
Figure 3B:
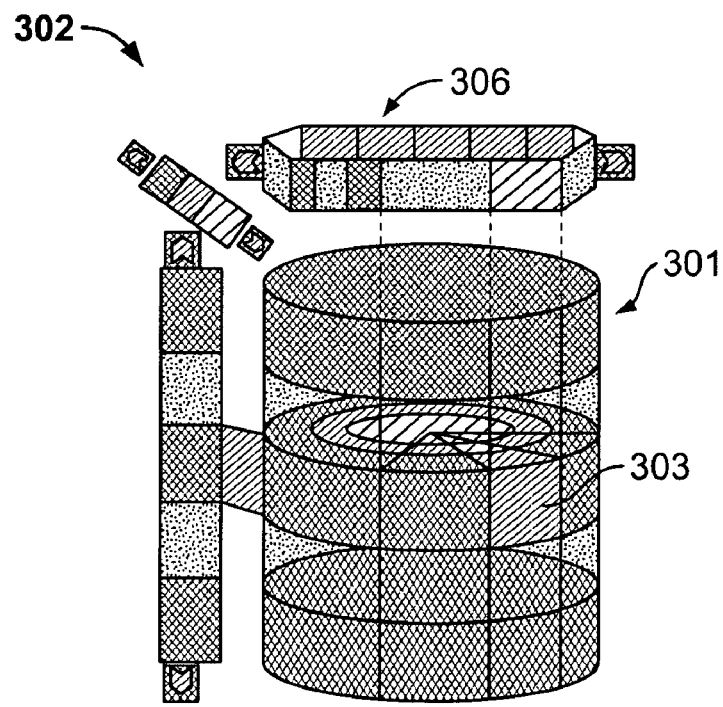

FIGS. 3A and 3B illustrate multi-dimensional control systems 300 and 302, respectively, each having a number of spatial dimensions, and each spatial dimension representing any number of properties such as a hierarchy, or set of hierarchies. The combination of dimensions defines a graphical structure 301. Each spatial dimension is associated with a user-selectable control 304, 306 that allows the selection and manipulation of a group of segments 303 belonging to the node of the corresponding dimension, and preferably ignoring the remaining dimensions.

For each dimension, labels for the associated segments 303 can be displayed in or proximate to the control 304, 306. For example, the control 304, 306 can be a bar with colors or shading corresponding colors or shading of associated segments 303. In the example in system 300, control segment 307 corresponds to graphical segment 305. The control 304, 306 can also be a group of directional arrows or icons for navigating across the displayed graphical structure. For instance, control 306 includes directional arrows for shifting the segments of a control bar as well as associated segments of the related graphical structure.

Selections with respect to one spatial dimension can be combined with selections in other spatial dimension(s) resulting in the intersection of unification (join) of the selected groups. The selection type (i.e. intersection or unification) is selected by a context menu (not shown) that can be provided by a right mouse click or using a combination of input keys (e.g. CTRL+function). The selected segments 303 can be grouped together. The groups can be stored with certain identifiers via context menu on one of the selected segments.

Operations on groups of segments 303 can be performed. The operations can include intersection, unification, and subtraction. Other operations are possible. The groups and operations thereon can be visualized using different shading or borders. Types of visualizations can be customizable. Groups can be active or inactive, and activated by mouse click on a segment 303 of the group or via context menu.

Active groups can be highlighted or otherwise distinguished from inactive groups. Multiple groups can be activated at one time. A segment 303 can be activated via mouse click, and all groups that contain the activated segment 303 can be activated by further mouse clicks on the segment. For example, a first user input to a segment 303, such as a mouse click on the graphical depiction of the segment, activates the segment. A second user input activates a first group of segments 303 not currently active but associated with the activated segment 303. A third user input activates a second group of segments 303, and so on.

Multiple groups can be activated together. Groups can be defined in various ways, such as "favorite groups" or "initially active groups." A user can "browse" through segment-related groups by other user input such as hitting the TAB key of a keyboard. When different groups are activated in the GUI, the user can access information from any or all of these groups. The user can use the context menu to choose which information is to be displayed. For example, the user can select the number of documents to which a certain attribute value is assigned (clustering). The user can also preselect relevant attributes according to which the information is to be clustered.

Data objects contained in the activated groups can be clustered according to the group, and subcategories of each group can be displayed to indicate hierarchies. The selection and display of information and data objects can generate statistical information, which can also be displayed in association with user selections. All of the information related to the user selection of segments 303 and/or groups can be displayed on a single page in the GUI or on multiple pages.

Groups can also be created according to an algorithm. For example, a segment 303 can be automatically included in a group if the segment 303 contains more than a predetermined number of items, or some other quantity or quality defined by an application. The control systems 300, 302 can also automatically generate a representation of whether or not a segment 303 belongs to a group. Accordingly, one or more groups may be formed according to such an algorithm.

Search results can be visualized in many different ways. In one example, all segments that contain resulting objects of a search can be highlighted. Highlighted segments can be rearranged and stored as a new group. The number of hits for each segment based on a collection of searches can also be displayed. Other useful statistics that can be displayed include: in which segment is found more than N documents with more than X % of quality. In another example, all activated groups that contain resulting objects of the search can be highlighted. The number of hits for each group can be displayed, as well as the number of hits not contained in any active group. Searches can be restricted to active groups. For combined searches, i.e. searches dealing with Boolean expressions and/or various attributes, special highlights can be provided for segments or groups. For instance, if the user selects M conditions for search, the user can also select an arbitrary subset of those conditions and the system can display the corresponding results in the GUI.

Each dimension can be identified with an attribute. For example, scale or relative size can represent an attribute value. Objects for which a dimension-relevant attribute does not possess any value are interpreted as objects with a null attribute value. This null value is handled as an ordinary attribute value, i.e. represented in the scale. By setting a certain flag, such as from the context menu or other user control, these null values can be hidden.

The controls 304, 306 enable a number of graphical operations on the graphical structures 301. For example, the graphical structures can be rotated, switched, exploded and/or accessed. Each control 304, 306 is associated with a spatial dimension of the corresponding graphical structure 301 of a control system 300, 302. The controls 304, 306 allows the selection of a group of segments 303, 305 that belong to the node of the corresponding dimension. Controls 304 include buttons to manipulate and control, i.e. rotate, the graphical representation of objects, while controls 305 show a control that must be "grasped" and manipulated by a user-controlled graphical cursor or icon, such as by operation of a mouse or other input device to a computer. The controls 304, 306 can be represented as a linearly for linear graphical arrangements, or as a closed strap for circular arrangements. Other representations are possible.

In a rotation operation, the scale order of segments 303 or groups of segments 303 can be rotated, i.e. a user interested in a specific step may want the step on top while maintaining the general displayed order. In a switch or mirror operation, dimensions can be exchanged (i.e. horizontal for vertical), or hidden segments can be made visible. The switch can be executed between dimensions, to hide or unhide segments, or to hide empty segments, categories or dimensions. The switch operations and other operations can also be executed by a "drag and drop" operation, pull-down control menu, pop-up control menu, or via navigation bar.

The explode operation allows for drill-down into a selected segment, i.e. if a category (attribute value) contains subcategories, the graphical representation of the segment can be refined to include display of the subcategories. The explode operation and other operations can be generalized for groups of segments. Information access operations can include a display of results in the same graphic, a display of results in a new graphic, or in an additional list or page. A user input such as a double click of a mouse and pointer within a displayed segment allows access to the information related to the active segment (or group).

A navigation structure can show one or more active groups. All inactive segments can be hidden by a hide operation, so that and restrict the representation to the active segments are only displayed. Thus, a selection of segments 303 can be displayed. The explode operation can also be used to make hidden segments visible. For example, if some subcategories of a category are hidden, the explode operation of the categories makes all subcategories visible again.

The controls 304, 306 can be provided to both two and three-dimensional graphical representations of the control systems. Accordingly, the graphical representations of the control systems not only enable document access thereby, but also provide a user functional control over the control systems for functions such as exception handling, processing of search results, object grouping, etc.

Although a few embodiments have been described in detail above, other modifications are possible. For example, a stylesheet can be used to personalize graphic types, attributes such as color, texture, shading, and style or the like. Other embodiments may be within the scope of the following claims.

The invention claimed is:

1. An information system comprising:
a graphical user interface;
one or more three-dimensional concentric cylinders graphically displayed, by a computer, in the graphical user interface, each cylinder represented by two or more spatial dimensions, an intersection of the two of more spatial dimensions defining a segment, wherein the segment represents a collection of information representative of a task of a project, and wherein the segment represents the intersection of the two or more spatial dimensions, each cylinder of the one or more three-dimensional concentric cylinders comprising a plurality of segments, each segment being three-dimensional such that each segment characterizes a portion of a corresponding sector of a respective disk portion of a corresponding three-dimensional concentric cylinder; and
one or more controls displayed, by the computer, in the graphical user interface with the one or more concentric cylinders, the one or more controls being responsive to user input and configured for graphically manipulating selected segments of the one or more concentric cylinders, the selected segments being selected by a user from the plurality of segments, one or more segments being resized automatically to fill a space corresponding to a neighboring segment that is empty, the selected segments being grouped together in a grouping using the graphical user interface to enable operations on the selected segments, the grouping being visually indicated by at least one of a shading or a border, the operations including at least one of a subtraction and a unification, the one or more controls being represented by one or more straps around at least one of the concentric cylinders, the grouping being configured to provide activation and deactivation of a plurality of groups, the activation of the plurality of groups is further configured to provide activation of at least one of the groups to enable the user to search the information, the information being searched only in the selected segments of the activated plurality of groups.

2. A system in accordance with claim 1, wherein the segment of a cylinder represents information related to the task of a project.

3. A system in accordance with claim 2, wherein the one or more controls includes a control bar.

4. A system in accordance with claim 1, wherein each control is associated with a spatial dimension defining concentric cylinder.

5. A system in accordance with claim 4, wherein each spatial dimension represents one or more properties of a collection of information represented thereby.

6. A system in accordance with claim 4, wherein the control is configured to manipulate the concentric cylinder according to the associated spatial dimension.

7. A system in accordance with claim 4, wherein the control includes a graphic representation of each segment of the concentric cylinder defined by spatial dimension.

8. A system in accordance with claim 1, wherein the one or more controls includes three navigation bars, one for each dimension, and configured to manipulate a particular dimension of the three dimensional concentric cylinders.

9. A method in accordance with claim 1, wherein one or more colors of the one or more controls correspond to one or more colors of associated selected segments.

10. An information access system comprising:
a user input device;
a graphical user interface;
a plurality of three-dimensional concentric cylinders graphically displayed in the graphical user interface, each concentric cylinder defined by three or more spatial dimensions, an intersection of the three or more spatial dimensions defines a segment, and wherein the segment represents a defined collection of information representative of a task of a project, and wherein the segment represents the intersection of spatial dimensions, each cylinder of the one or more three-dimensional concentric cylinders comprising a plurality of segments, each segment being three-dimensional such that each segment characterizes a portion of a sector of a respective disk of a corresponding cylinder of the plurality of three-dimensional concentric cylinders; and
one or more controls displayed in the graphical user interface with the one or more concentric cylinders, the one or more controls being responsive to commands generated from the user input device, and configured for graphically manipulating selected segments of the one or more concentric cylinders, the selected segments being selected by a user from the plurality of segments, one or more segments being resized automatically without user input from the user input device to fill a space corresponding to a neighboring segment that is empty, the selected segments being grouped together in a grouping using the graphical user interface to enable operations on the selected segments, the grouping being visually indicated by at least one of a shading or a border, the operations including at least one of a subtraction and a unification, the grouping being configured to provide activation and deactivation of a plurality of groups, the activation of the plurality of groups is further configured to provide activation of at least one of the groups to enable the user to search the information, the information being searched only in the selected segments of the activated plurality of groups.

11. A system in accordance with claim 10, wherein the three or more spatial dimensions include a color or shading.

12. A system in accordance with claim 10, wherein the three or more spatial dimensions include a scale and relative size.

13. A system in accordance with claim 10, wherein the user input device includes a mouse.

14. A system in accordance with claim 10, wherein the graphical user interface is displayed in a display monitor coupled to a computer processor, and wherein the computer processor is connected with the user input device.

15. A system in accordance with claim 10, wherein each control is associated with a spatial dimension defining each concentric cylinder.

16. A system in accordance with claim 15, wherein the control is configured to manipulate each concentric cylinder according to the associated spatial dimension.

17. A system in accordance with claim 15, wherein each control includes a graphic representation of each segment of each concentric cylinder defined by a spatial dimension.

18. A method for providing access to information, the method comprising:
displaying one or more three-dimensional concentric cylinders in a graphical user interface, each concentric cylinder being defined by two more spatial dimensions, an intersection of the two more spatial dimensions defines a segment, and wherein the segment represents a defined collection of information representative of a task of a project, and wherein the segment represents the intersection of spatial dimensions, each cylinder of the one or more three-dimensional concentric cylinders comprising a plurality of segments, each segment being a three-dimensional portion of a corresponding cylinder of the one or more three-dimensional concentric cylinders; and
displaying in the graphical user interface, with the one or more three-dimensional concentric cylinders, one or more controls responsive to user input, and configured for graphically manipulating selected segments of the one or more three-dimensional concentric cylinders, the selected segments being selected by a user from the plurality of segments, one or more segments being resized automatically without user input to fill a space corresponding to a neighboring segment that is empty, the selected segments being grouped together in a grouping using the graphical user interface to enable operations on the selected segments, the grouping being visually indicated by at least one of a shading or a border, the operations including at least one of a subtraction and a unification, the one or more controls being represented by one or more straps around at least one of the concentric cylinders, the grouping being configured to provide activation and deactivation of a plurality of groups, the activation of the plurality of groups is further configured to provide activation of at least one of the groups to enable the user to search the information, the information being searched only in the selected segments of the activated plurality of groups.

19. A method in accordance with claim 18, further comprising:

receiving a command representing a user input; and manipulating selected segments of the one or more three-dimensional concentric cylinders according to the command.

20. A method in accordance with claim 18, wherein the user input is represented as an action in the graphical user interface.

* * * * *